United States Patent
Greene et al.

(10) Patent No.: US 6,471,878 B1
(45) Date of Patent: Oct. 29, 2002

(54) METHOD FOR FORMING A RADIO FREQUENCY RESPONSIVE TARGET AND APPARATUS FOR VERIFYING THE AUTHENTICITY OF SAME

(75) Inventors: Morton Greene, Arlington, VA (US); G. William Hurley, Cattlet, VA (US)

(73) Assignee: Gordion Holding Corporation, Vienna, VA (US)

( * ) Notice: Subject to any disclaimer, the term of this patent is extended or adjusted under 35 U.S.C. 154(b) by 0 days.

(21) Appl. No.: 09/328,651

(22) Filed: Jun. 9, 1999

Related U.S. Application Data

(60) Division of application No. 08/759,294, filed on Dec. 2, 1996, now abandoned, which is a continuation-in-part of application No. 08/298,070, filed on Aug. 30, 1994, now Pat. No. 5,581,257.

(51) Int. Cl.$^7$ ................................................. H01B 13/00
(52) U.S. Cl. ............................. 216/13; 216/62; 216/66; 216/75; 216/100; 340/10.1; 340/572.4
(58) Field of Search .............................. 340/5.8; 216/62, 216/66, 67, 41, 47, 48, 13, 75, 100; 438/695, 705

(56) References Cited

U.S. PATENT DOCUMENTS

| | | | |
|---|---|---|---|
| 3,876,865 A | 4/1975 | Bliss | 235/492 |
| 3,959,630 A | 5/1976 | Hogberg | 235/491 |
| 4,188,707 A * | 2/1980 | Asano et al. | 438/301 |
| 4,218,674 A | 8/1980 | Browsow et al. | 340/5.86 |
| 4,497,686 A * | 2/1985 | Weglin | 216/41 |
| 4,569,124 A * | 2/1986 | Rensch et al. | 438/81 |
| 4,673,932 A | 6/1987 | Ekchain | 340/10.32 |
| 4,748,679 A | 5/1988 | Gold et al. | 340/5.86 |
| 4,811,408 A | 3/1989 | Goldman | 340/5.83 |
| 4,827,395 A | 5/1989 | Anders et al. | 340/10.34 |
| 5,214,410 A | 5/1993 | Verster | 340/505 |
| 5,266,926 A | 11/1993 | Beigel | 340/572.1 |
| 5,382,784 A | 1/1995 | Eberhardt | 235/383 |
| 5,430,441 A | 7/1995 | Bickley et al. | 340/10.2 |
| 5,786,910 A | 7/1998 | Walters et al. | 342/51 |

* cited by examiner

*Primary Examiner*—Brian Zimmerman
*Assistant Examiner*—Yves Dalencourt
(74) *Attorney, Agent, or Firm*—ReedSmith LLP; Thomas J. McWilliams

(57) ABSTRACT

A method for forming a radio frequency responsive target formed of a pattern of thin dipoles, each of which has a position and angular orientation within the pattern, which produce a composite analog radio frequency signal in response to an interrogating signal. A first metallic film layer is deposited on top of a non-conductive substrate, an etchant resistant pattern correspondent to the thin dipole pattern is deposited on top of the first metallic film layer, and a second metallic layer occupying the first metallic layer in at least one area without etchant is applied on top of the first metallic film layer. The etchant resistant pattern is removed to expose portions of the first metallic film layer, and the second metallic layer and the exposed portions of the first metallic film layer are etched simultaneously.

15 Claims, 8 Drawing Sheets

METHOD FOR FORMING A RADIO FREQUENCY RESPONSIVE TARGET AND APPARATUS FOR VERIFYING THE AUTHENTICITY OF SAME

CROSS-REFERENCE TO RELATED APPLICATION

This application is a divisional application No. 08/759,294 filed on Dec. 2, 1996 now abandoned.

The present application is a continuation-in-part of U.S. patent application Ser. No. 08/298,070, filed Aug. 30, 1994 now U.S. Pat. No. 5,581,257 entitled "Radio Frequency Automatic Identification System," currently pending.

FIELD OF THE INVENTION

This invention relates to automatic identification targets having radio frequency taggants formed from thin metal objects or dipoles.

BACKGROUND OF THE INVENTION

Automatic identification systems are widely used to input data into computer systems and to control operation of equipment. Radio frequency operated systems are often used in automatic identification applications where identification of an object is to be made without contact and where the application may not permit line-of-sight communication between the object and a sensor. Radio frequency automatic identification ("RF/AID") systems are based on "targets" which generally function as transponders. Upon receipt of a radio frequency interrogating signal, the target responds by producing a detectable radio frequency response signal. Such targets have taken the form of tags or labels which are affixed to an object to be identified. As used herein, a "target" is any radio frequency responsive means which may be attached to, printed upon, embedded in, or otherwise associated with an object to be identified. Although the term "radio frequency" is used herein because that is the region of the electromagnetic spectrum which is most frequently used for such automatic identification, it will be understood that the invention embraces any electromagnetic radiation. Automatic identification systems are presently used or contemplated for use in a wide variety of applications for monitoring of people, animals, locations, and things. Such applications include material handling, such as automatic storage and retrieval; cargo handling, such as baggage sorting and tracking; asset management, such as of rental vehicles or for retail theft control; identification of persons, such as for facility access control or patient tracking; and identification of animals, such as for automatic feeding.

One major attribute of presently available RF/AID systems which limits their use is that the target cost is substantial. Situations in which this high cost can be justified include those where targets are removed from an item after purchase and reused on other items, those where the item to be identified is costly or important, and those where an item is likely to be misappropriated absent some effective control system. Another attribute which restricts use of present RF/AID systems is the target size. Targets are typically several inches long, which inhibits their use where small items are to be identified or where it is desired that the target be unobtrusive.

Both of these attributes result in large part from the structure typically employed for RF/AID targets and the frequency at which they operate. Such targets typically contain an antenna for receiving an interrogating RF signal; radio frequency processing means for determining whether an interrogating signal has been received; and radio frequency transmitting means responsive to the processing means for transmitting a detectable RF response signal from the target. Present systems typically operate at fairly low frequencies.

One application for which existing RF/AID techniques have not been used, due to the cost, size, and limited information content of prior art targets, is identification of documents including currency, financial instruments such as credit cards, and personal identification instruments such as a driver's license or passport. Counterfeiting of currency has become a major problem, on scales and using technology ranging from color photocopying to altering of genuine currency printing operations. Credit card fraud, involving magnetic programming of counterfeit cards or reprogramming of genuine ones, has become epidemic. Existing techniques for identifying such items are obviously deficient. Ordinary business documents would desirably be protectable from unauthorized copying or use and verifiable as original or genuine, but no effective means for doing so are available.

The present invention is directed to a new system for RF/AID which avoids the foregoing drawbacks of the prior art and is suitable for use in a wide variety of applications which were not possible using prior art systems.

It is therefore an object of the present invention to provide a low cost system for producing radio frequency responsive targets which are suitable for identifying and authenticating a wide variety of objects including currency, financial instruments such as credit cards, and personal identification instruments such as a driver's license or passport.

It is a further object of the present invention to provide a low cost, reliable, high speed, system for reading a radio frequency responsive target associated with an object and thereby verifying the authenticity of the object.

These and other objects and advantages of the invention will become more fully apparent from the description and claims which follow or may be learned by the practice of the invention.

SUMMARY OF THE INVENTION

The present invention is directed to a method for forming a radio frequency responsive target formed of a pattern of thin dipoles which produce a composite analog radio frequency signal in response to an interrogating signal. A first metallic film layer is deposited on top of a non-conductive substrate. The pattern of thin dipoles is generated such that each of the thin dipoles has a position and an angular orientation within the pattern of thin dipoles. An etchant resistant pattern is deposited on top of the first metallic film layer, the etchant resistant pattern corresponds to a photographic image of the pattern of thin dipoles. A second metallic layer is applied on top of the first metallic film layer. The second metallic layer occupies areas on the first metallic film layer where the etchant resistant pattern is absent, and the second metallic layer has a thickness equal to the thickness of the etchant resistant pattern. The etchant resistant pattern is removed in order to expose portions of the first metallic film layer. The second metallic layer and the portions of the first metallic film layer are etched simultaneously until the portions of the first metallic film layer have been removed from the non-conductive substrate.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE PREFERRED EMBODIMENT

The system of the present invention provides automatic item identification in a manner which, like existing RF/AID systems, can be free from the constraints of line-of-sight detection imposed by barcode systems and short range detection imposed by magnetic encoding systems. Unlike existing RF/AID systems, the system of the present invention is operable with inexpensive targets which may be of small size. The system is operable at great distances as well as in confined areas. The information-containing components of the invention may be fashioned into targets which are easily applied to a wide variety of items to be identified. Such items may be reliably identified using versatile, low-cost interrogating systems.

Figure 1:
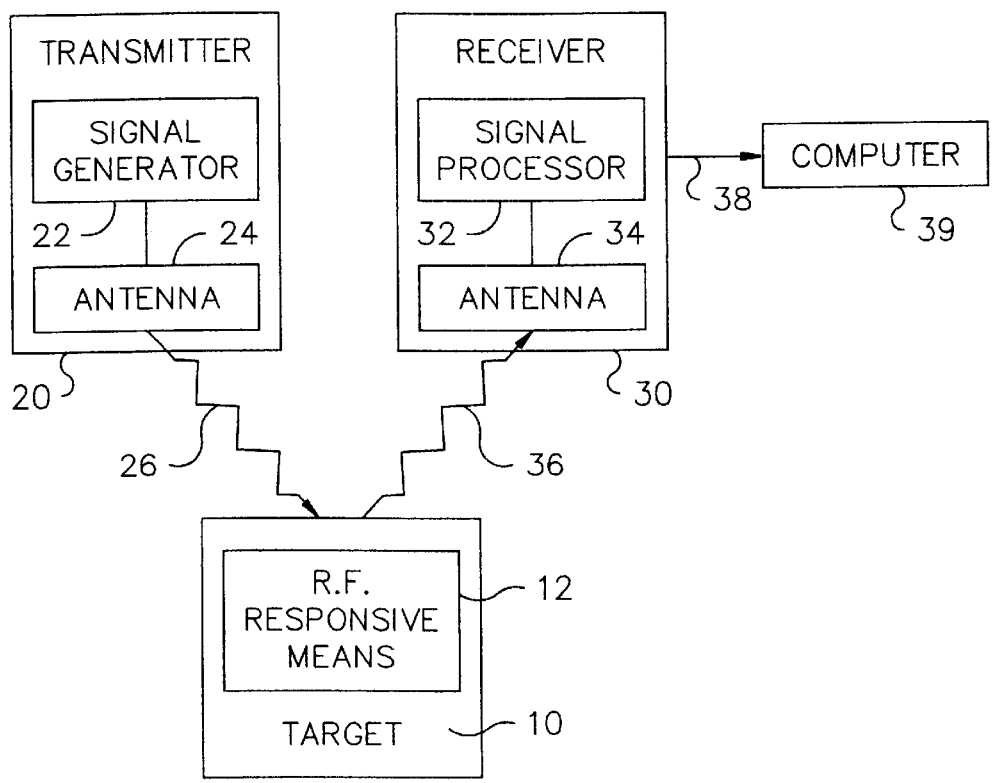
FIG. 1 is a block diagram generally illustrating the functional elements of an RF/AID system.

Referring now to FIG. 1, the functional elements of an RF/AID system are shown. The system includes a target 10 which includes and serves as a carrier for radio frequency responsive means 12. Such a target 10 may be affixed to or incorporated in an object to enable it to be detected and/or identified by a system, often referred to as a scanner or reader, which includes a radio frequency transmitter 20 and a radio frequency receiver 30. Transmitter 20 includes a signal generator 22 coupled to an antenna 24 for generating radio frequency interrogating signals 26 in a desired target field. Receiver 30 receives radio frequency response signals 36 at antenna 34 coupled to signal processor 32. As explained more fully below, radio frequency response signals 36 may optionally be used to uniquely identify or verify the authenticity of an object associated with the target 10. Signal processor 32 produces an output 38 indicative of the target 10 within the target field in response to the response signals 36 received by antenna 34. Output 38 may be supplied to a computer or other identification information processing system 39. Transmitter 20 and receiver 30 may be physically associated in a single transceiver unit, and the functions of antennas 24 and 34 may be performed by a single antenna A system as shown in FIG. 1 may be designed to detect radio frequency responses in the near field of the antenna(e), in the far field of the antenna(e), or both.

Figure 2:
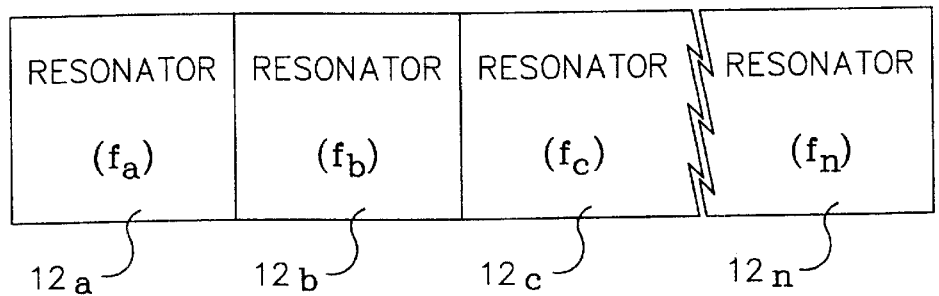
FIG. 2 is a block diagram illustrating the radio frequency responsive means shown in FIG. 1.

Referring now to FIG. 2, the function of the preferred radio frequency responsive means 12 shown in FIG. 1 is illustrated in greater detail. Responsive means 12 includes a plurality of devices which are resonant at radio frequency. FIG. 2 shows resonant means or resonators 12a, 12b, 12c . . . 12c which are resonant at frequencies $f_a, f_b, f_c \ldots f_n$. These frequencies represent a subset of possible resonant frequencies which may be provided by resonators in target 10. The resonators 12a, 12b, 12c . . . 12c preferably have different resonant frequencies. In a particularly preferred embodiment described in connection with FIG. 3 below, each resonator 12a, 12b, 12c . . . 12c with a target 10 has a resonant frequency within the range of 20 GHz—30 GHz and the resonant frequencies of the resonators 12a, 12b, 12c . . . 12c preferably vary randomly within the target 10. As explained more fully below, when a target 10 is formed in accordance with the preferred embodiment mentioned above, and the resonators 12a, 12b, 12c . . . 12c within the target 10 are simultaneously illuminated with an interrogating signal, the resonators 12a, 12b, 12c . . . 12c act to collectively generate a responsive composite RF waveform (or RF signature) which may then be used to uniquely identify the target.

Figure 3:
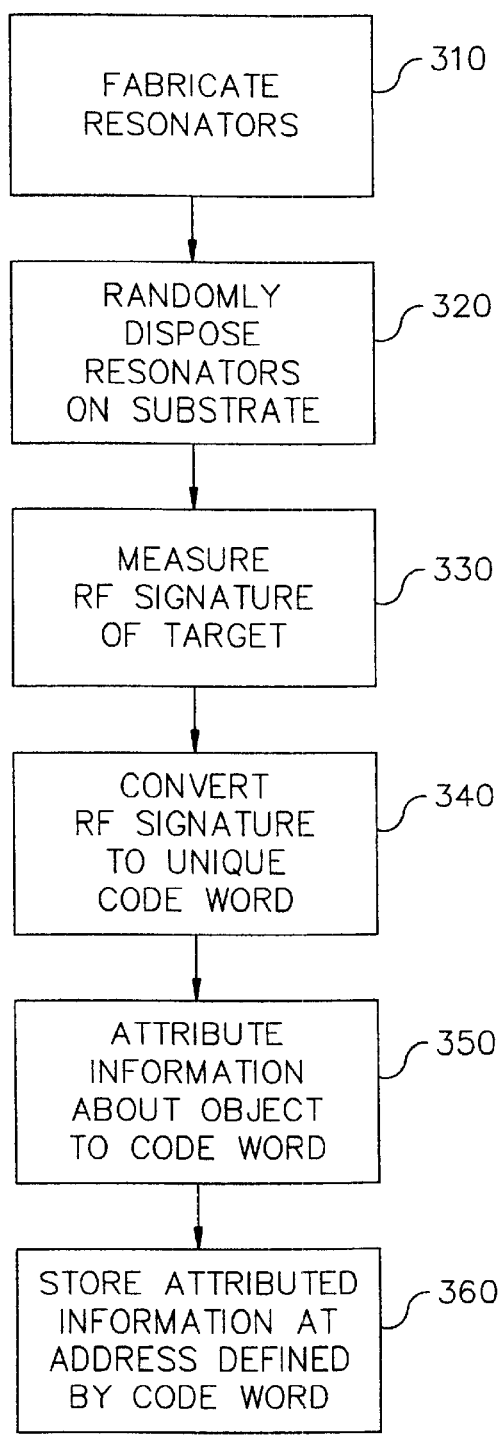
FIG. 3 is a flow diagram illustrating a process for producing radio responsive targets formed of randomly dispersed radio responsive resonators and storing information associated therewith, in accordance with a preferred embodiment of the present invention.

Referring now to FIG. 3, there is shown a flow diagram illustrating a process 300 for producing radio responsive targets formed of randomly dispersed radio responsive resonators and storing information associated therewith, in accordance with a preferred embodiment of the present invention. In steps 310 and 320, a plurality of resonators are fabricated and then randomly disposed on a substrate in order to form a target. Various methods for forming resonators and for disposing such resonators on a substrate are set forth in parent application Ser. No. 08/298,070, the contents of which are hereby incorporated herein in their entirety by reference. A further method for forming targets by randomly dispersing resonators on a substrate is set forth below in connection with FIGS. 12A–12D. Next, in step 330, a measurement (or reading) is performed on the target to determine the characteristics of the responsive RF waveform which will result when the target is illuminated with a predetermined interrogating signal. When the resonators in a target are randomly distributed and the target is illuminated with an interrogating signal using a reader as described below, multiple reflections created by the plural, randomly oriented resonators in the target collectively result in a singular composite analog RF waveform (or RF signature) which can be received by a detector in the reader. Such a composite RF signature (shown in FIG. 11 below) may then be used to uniquely identify or verify the authenticity of the target.

Referring still to FIG. 3, in step 340, the RF signature measured in step 330 is converted to a digital code word. As explained more fully below in connection with FIGS. 8–11, the RF signature read in step 330 corresponds to an analog signal having an amplitude which varies as the position of the target varies within the reading device. In step 340, this analog RF signature is digitized (or sampled) to form a digitized RF response signal, and the digitized RF response signal is normalized to produce a normalized digitized RF response signal which is then converted to a code word. In a preferred embodiment, the digitized RF response signal is converted to a code word using equation (1) below:

$$S_i = A_i (A_{pk}/A_{fs})^{-1} dA/dp \qquad (1)$$

where $S_i$ represents the slope of the normalized digitized RF response signal at a sampling position i, $A_i$ represents the amplitude the digitized RF response signal at a sampling position i, $A_{pk}$ represents the peak or maximum amplitude of the digitized RF response signal, $A_{fs}$ represents the full scale amplitude (maximum amplitude minus minimum amplitude) of the digitized RF response signal, and dA/dp represents the first order derivative (difference in amplitude/difference in position) of the digitized RF response signal. It will be understood by those skilled in the art that numerous alternative methods are known for normalizing a digital waveform including spectral analysis, and many methods exist for determining the slope of a digital waveform at a particular location including, for example, the Fast Fourier Transform and Least Mean Square methods.

Since equation (1) functions to normalize the digitized RF response signal, equation (1) may be used to eliminate read-to-read variations that may occur between various RF readers in an automatic identification system which uses multiple readers for cataloging, identifying and/or verifying RF targets. In addition to normalizing the digitized RF signal, equation (1) also functions to identify the slope of the digitized response RF response signal at various sampling points along the length of that signal. In a particularly preferred embodiment, the slope function $S_i$ is converted to a 16-bit code word by scanning $S_i$ and identifying the positions along $S_i$ which correspond to a zero slope, a positive 45-degree slope, and a negative 45 degree. Values corresponding to the locations of the positions along $S_i$ which correspond to a zero slope are then summed and truncated to yield a 5-bit value corresponding to bits 0–4 of the code word; values corresponding to the locations of the positions along $S_i$ which correspond to a positive 45-degree slope are summed and truncated to yield a 5-bit value corresponding to bits 5–9 of the code word; and values corresponding to the locations of the positions along $S_i$ which correspond to a negative 45-degree slope are summed and truncated to yield a 6-bit value corresponding to bits 10–15 of the code word. It will be understood by those skilled in the art that any set of slope values from the slope function $S_i$ may be used for converting $S_i$ into a code word, and that such a code word may be longer or shorter than the 16-bit code word described above. It will also be understood by those skilled in the art that various other methods exist for converting the normalized digitized RF waveform described above into a code word, including weighted digital filtering, wavelet analysis and other digital signal processing techniques, and that the use of such other techniques to convert the normalized digitized RF waveform described above into a code word would fall within the scope of the present invention.

Referring still to FIG. 3, in steps 350 and 360, information associated with the target is attributed to the code word derived from the target, and this attributed information is stored in a database along with the code word. In a particularly preferred embodiment, the code word is used as an address or an index into a lookup table which stores the attributed information associated with each valid code word in the system. When, for example, RF targets formed in accordance with the present invention are used for identification of a credit card, the attributed information associated with a code word might optionally consist of the name of the credit card holder and a credit card account number. In an alternative embodiment where RF targets formed in accordance with the present invention are used to identify/verify a personal identification card such as a driver's license or passport, the attributed information associated with the code word might optionally consist of the name and address of the holder. In a still further alternative embodiment where RF targets formed in accordance with the present invention are used to verify documents such as currency, no information may be attributed with the code word. In such a case, the presence of the code word on a list of valid code words may be used to verify the authenticity of the document. In a preferred embodiment, if, after performing step 340, the system determines that the code word corresponding to the target being measured is equal to a code word already represented in the database by another target, then the target being measured is rejected and no information associated with that target is stored in the database.

Figure 4:
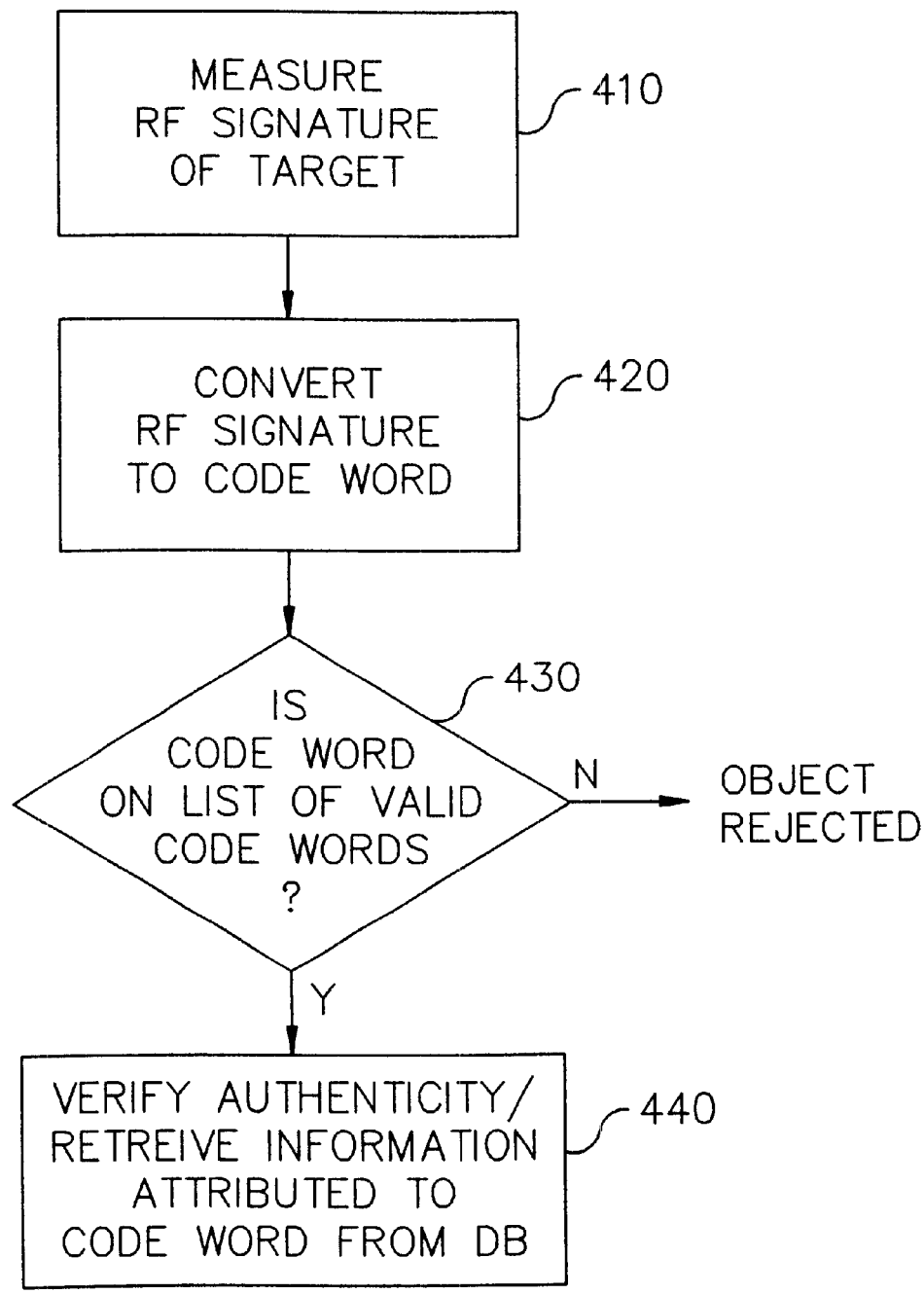
FIG. 4 is a flow diagram illustrating a process for reading and verifying the authenticity of radio responsive targets formed of randomly dispersed radio responsive resonators, in accordance with a preferred embodiment of the present invention.

Referring now to FIG. 4, there is shown a flow diagram illustrating a process 400 for reading and verifying the authenticity of radio responsive targets formed of randomly dispersed radio responsive resonators, in accordance with a preferred embodiment of the present invention. In step 410, a measurement (or reading) is performed on the target to determine the characteristics of the responsive RF waveform which results when the target is illuminated with a predetermined interrogating signal. Step 410 is performed substantially the same as step 330 described above. In step 420, the RF signature measured in step 410 is converted to a digital code word. The procedure used for converting the RF signature to a code word in step 420 is preferably identical to the procedure used for converting the RF signature to a code word in step 340 above. Next, in step 430, the code word from step 420 is compared to the list of valid code words generated using process 300 described above. If the code word from step 420 is not present on the list of valid code words, then the target (and any object associated therewith) is rejected as not being authentic. Alternatively, if the code word from step 420 is found to be present on the list of valid code words, then (in step 440) the target (and any object associated therewith) is verified as being authentic, and any information previously attributed to the target is retrieved from the database (or lookup table) as described above.

Figure 5:
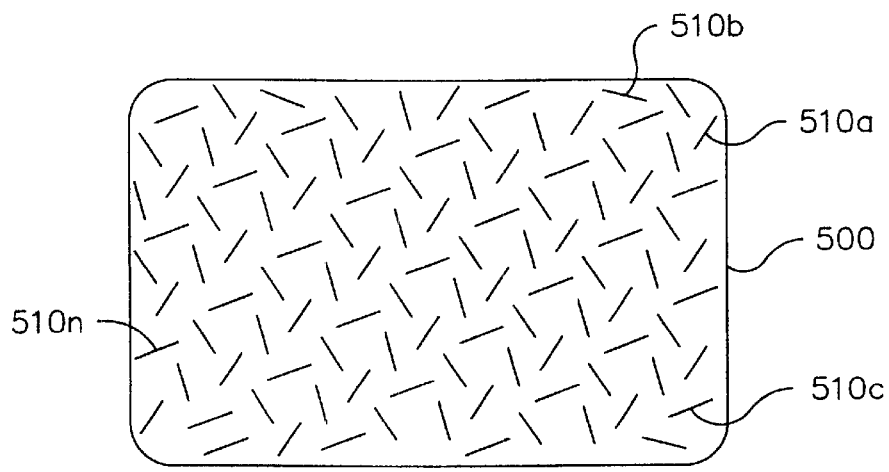
FIG. 5 is a top view of a plastic nonconductive substrate having a plurality of randomly dispersed radio responsive resonators affixed thereto, in accordance with a preferred embodiment of the present invention.

Referring now to FIG. 5, there is shown a top view of a plastic nonconductive substrate 500 having a plurality of randomly disposed radio responsive resonators 510 affixed thereto, in accordance with a preferred embodiment of the present invention. This embodiment is particularly useful for identification of items having a target which may be easily brought into a closely adjacent relationship with a transceiver reading device for illuminating the target with an interrogating signal. Examples of such applications include the identification of credit cards, driver's licenses, currency and other documents which provide a two-dimensional area that may be encoded with resonators. Labels or tags which may be applied to the surface of an article to identify it may also be encoded with randomly disposed resonant articles. All of such specific embodiments may be referred to herein by the generic term "document".

FIG. 5 illustrates a substrate 500 which has been encoded using a set 510 of resonant articles 510a–510n which are affixed to the substrate. The resonant articles 510a–510n are depicted as line segments in that a preferred type of resonant article is a thin dipole such as an elongated metal or metalized article. Such a dipole is resonant at an interrogating frequency at which the dipole is ½ wavelength in length. A wide variety of lengths may be used depending on the resonant frequency desired and the nature of the reader. In a particularly preferred embodiment, resonant articles 510a–510n are formed of thin dipoles having a thickness from 100 angstroms to 2 millimeters, each of the thin dipoles has a length of about 0.5 millimeters, and the thin dipoles have a density on non-conductive substrate 500 of from 2 to 5 dipoles per square cm of surface area on non-conductive substrate 500. Metalized glass fibers may also be used as the thin dipoles; such fibers may be on the order of 0.001" diameter.

Systems according the foregoing are applicable to a wide range of target and identification applications. For instance, the resonators may be extremely small, on the order of the wavelength of the interrogating signal. Resonators of one-half wave dimensions at frequencies on the order of 10–100 GHz are quite small, and large numbers of them may be used for uniquely identifying large numbers of targets. A particularly desirable mode of application of an identifying set of resonators is in a matrix of adherent radio frequency transparent material, forming an encoded "ink". Such an ink may be applied to a wide variety of types of materials to target them for identification. One application which deserves particular mention is in identifying documents. An ink comprising radio frequency resonators may be applied to a wide variety of documents to tag or identify them. Applications range from substitutes for barcodes or printed indicia, such as on checks and currency, to inclusion in toner to permit monitoring and/or identification of xerographically copied documents, laser-printed documents, or other documents whether printed by thermal set techniques or otherwise. Crystals or sets of identifying crystals may also be microencapsulated, and randomly dispersed in the bulk of a material to be identified.

Accordingly, steps 310–320 may be effectuated by disposing resonators in a document as the document base material is being fabricated, as for instance by dispensing resonators from a supply into a web of paper pulp (e.g. for currency) or soft plastic (e.g. for cards) while it is in a somewhat fluid-like condition as it is being formed, and prior to application of printing or magnetic coding materials. Steps 310–320 may also be effected by applying and adhering the resonators to the document after the base material has been fully formed, either before or after any printing, magnetic material, or other non-resonant information-bearing materials have been applied to the document.

Figure 6:
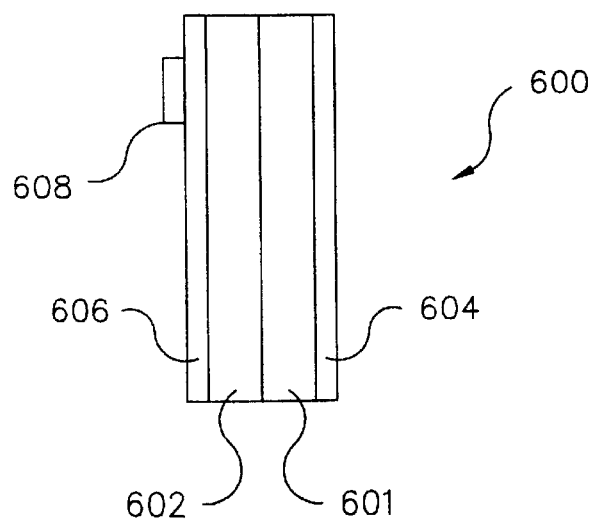
FIG. 6 is a side cross-sectional view of a plastic card which incorporates the structure shown in FIG. 5, in accordance with a preferred embodiment of the present invention used for identifying and verifying the authenticity of credit cards and personal identification cards.

Referring now to FIG. 6, there is shown a side cross-sectional view of a plastic card 600 which incorporates the structure shown in FIG. 5, in accordance with a preferred embodiment of the present invention used for identifying and verifying the authenticity of credit cards and personal identification cards. The card 600 is generally of conventional construction and includes a pair of inner plastic layers 601, 602 which may for instance be made of 0.012" thick opaque PVC sheet and a pair of outer plastic layers 604, 606 which may for instance be made of 0.0005" thick transparent PVC sheet. Printing may be disposed between the inner and outer layers, and the outer layers serve to protect the printing while maintaining it visible. Card 600 may have conventional data storage means such as magnetic stripe 608. Inner plastic layer 601 preferably corresponds substantially to the structure shown in FIG. 5, and therefore has a plurality of randomly disposed radio responsive resonators 510 affixed thereto. Card 600 differs from conventional cards in that it includes a plurality of resonant articles which can be used to identify and/or verify the authenticity of the card. Preferred resonant articles are thin dipoles 510a–510n of the sort which have been previously described, i.e. metal or metalized fibers. The resonant articles may also comprise metal or conductive structures which are disposed on a nonconductive substrate, as described below with respect to FIGS. 12A–12D. Dipoles 510a–501n may be disposed at any location in the card, but a preferred location is between the inner layers 601, 602. The dipoles may be randomly or orderly placed between layers 601, 602 during manufacture prior to lamination of the inner layers.

Figure 7:
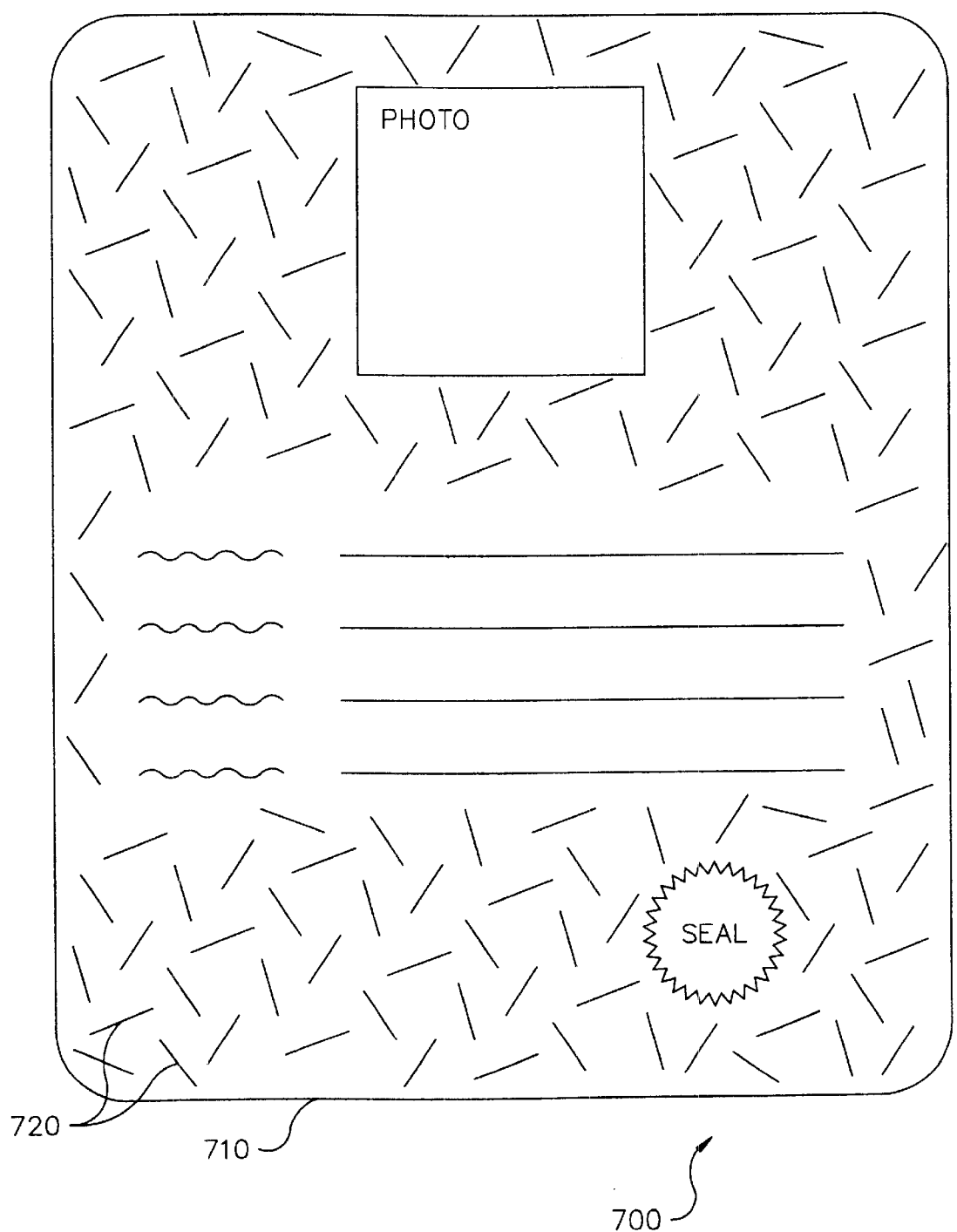
FIG. 7 is a top view of a paper non-conductive substrate having a plurality of randomly dispersed radio responsive resonators affixed thereto, in accordance with an alternative preferred embodiment of the present invention used for identifying and verifying the authenticity of passport/visa documents.

Referring now to FIG. 7, there is shown a top view of a paper non-conductive substrate 710 having a plurality of randomly dispersed radio responsive resonators 720 affixed thereto, in accordance with an alternative preferred embodiment of the present invention used for identifying and verifying the authenticity of a passport/visa document 700. Document 700 differs from conventional passport/visa documents in that it includes a plurality of resonant an articles 720 which can be used to verify the authenticity of the document. Preferred resonant articles are thin dipoles 510a–510n of the sort which have been previously described, i.e. metal or metalized fibers. As described above, resonant articles 720 may be disposed in document 700 as the substrate 710 is being fabricated, as for instance by dispensing resonators from a supply into a web of paper pulp while it is in a somewhat fluid-like condition as it is being formed, and prior to application of printing materials. Similarly, resonant articles 720 may be adhered to the document 700 after the substrate 710 has been fully formed, either before or after any printing or other non-resonant information-bearing materials have been applied to the document.

Figure 8:
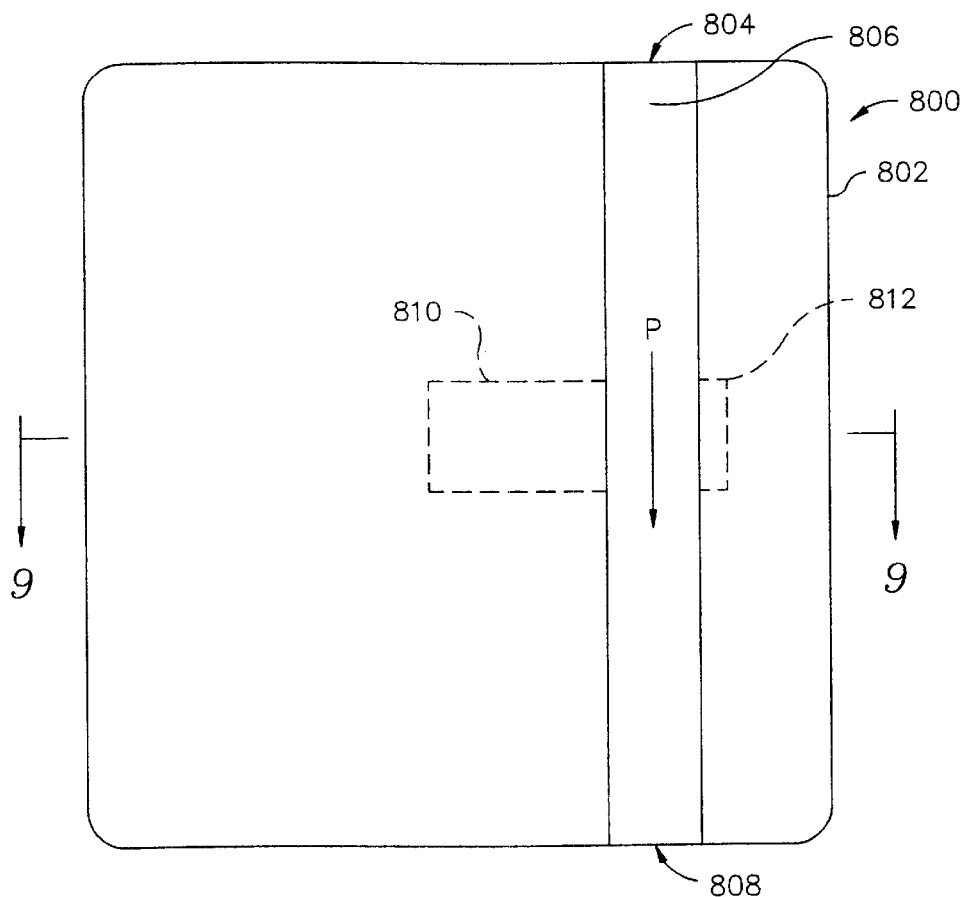
FIG. 8 is a front view of an RF reader for identifying radio responsive targets formed of randomly dispersed radio responsive resonators, in accordance with a preferred embodiment of the present invention.
Figure 9:
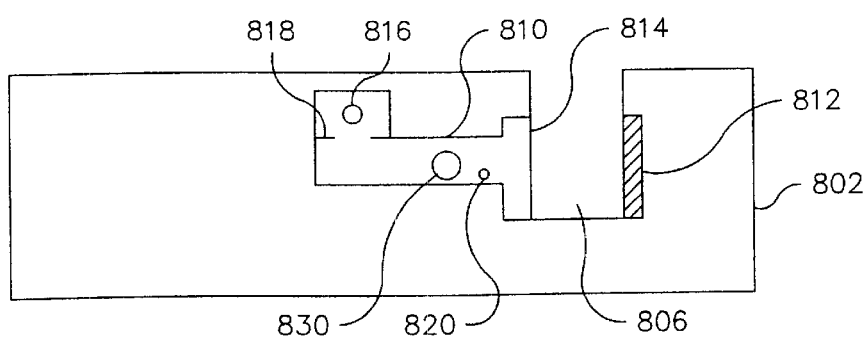
FIG. 9 is a cross-sectional view of the RF reader shown in FIG. 8.
Figure 10:
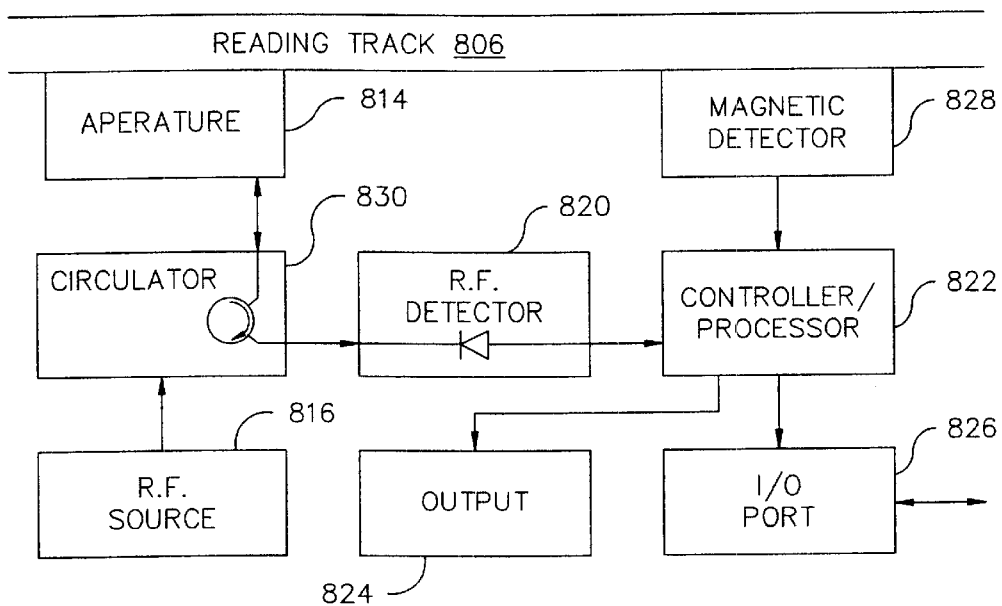
FIG. 10 is a schematic diagram illustrating the RF reader shown in FIGS. 8 and 9.

Referring now to FIGS. 8–10, there are shown front, cross-sectional and schematic views, respectively, of an RF reader 800 for identifying radio responsive targets formed of randomly dispersed radio responsive resonators, in accordance with a preferred embodiment of the present invention. RF reader 800 may be used to read documents such as those shown in FIGS. 4–6 by methods such as those shown in FIGS. 3 and 4. The reader components are contained within a housing 802 which includes an entrance 804 for receiving a document to be read, and a swiping slot 806 for guiding the document along a path P from entrance 804 to exit 808. An RF waveguide 810 is positioned adjacent to slot 806, and a reflecting plate 812 is positioned adjacent to slot 806 opposite waveguide 810. Reflecting plate 812 may be formed for example, of aluminum, copper, gold, silver or plated iron, plastic or glass, where the plating material is formed of one of the aforementioned metals. A nonconductive waveguide aperture 814 is positioned at the juncture between waveguide 810 and slot 806. Reader 800 includes a radio frequency source 816 (such as, for example, a Gunn diode) which is coupled to a resonant iris aperture 818. Source 816 functions to generate energy for illuminating the resonators in a target being scanned. In a particularly preferred embodiment where the resonant articles in the target being scanned are formed of thin dipoles having a thickness from 100 angstroms to 2 millimeters, a length of about 0.5 millimeters, and a density of from 2 to 5 dipoles per square cm, the frequency of the RF energy provided by source 816 is about 30 GHz.

An RF detector 820 is disposed so as to detect radio frequency energy emitted, in response to an interrogating signal from RF source 816, by resonators on a document being read. The operation of the reader 800 is controlled, and the information extracted from a document is processed, by a controller-processor 822. This functional block may be implemented by a variety of microprocessor-based systems, the construction of which is believed to be a straightforward matter for those skilled in that art. A suitable system may include a microprocessor, a memory containing a stored program for operating the system in accordance with this invention, and interface devices 824, 826 for interfacing the microprocessor with other functional blocks shown in FIG. 10.

RF source 816 feeds illuminating energy through aperture 814 via a circulator 830. The aperture 814 is disposed in a wall of the slot 806. RF energy propagates from source 816 through circulator 830, through aperture 814, and through the space in the slot to the reflecting plate 812 on the opposite wall of the slot. The reflecting plate 812 reflects energy back to aperture 814, where an appreciable amount of the energy is collected and propagates back through circulator 830 to RF detector 820, which may be a diode functioning as an envelope detector. The apparatus functions as a truncated transmission line with a standing wave. The RE reading apparatus is mechanically positioned to peak the power at the detector 820 when there is nothing in the slot 806. This can be effected by making the gap between detector 820 and reflecting plate 812 ¼ wavelength at the frequency of operation, which may be on the order of 24–30 GHz. When a card containing thin dipoles is passed through the slot 806, the dipoles nearly short the aperture and shift by approximately 90° the phase of the standing wave in the transmission line. The resultant drop in energy is detected by RF detector 820, and the detected signal (referred to as the RE signature of the card) is provided to controller/processor 822.

The longitudinal position of a target in a document being scanned may be determined using a separate magnetic detector 828 which simultaneously scans magnetic srp 608 which is preferably positioned in a predetermined spatial relationship with the target. The longitudinal position of the target may then be determined by correlating the energy detected by RE detector 820 with the position of the document along the path P as determined by magnetic detector 828. Reader 800 thus preferably includes means for reading both magnetic data included in a magnetic stripe upon a document or card, and for reading an RF target on the document or card. The apparatus may be built as a swipe-type reader, in which a person grasps the card along one edge, places the opposite edge in a slot or reading track in a card reader, and moves the card manually along the slot past stationary reading devices disposed in the slot walls. The slot or read ing track 806 includes a pair of side walls,, and a magnetic detector 828, such as a magnetic stripe read head, disposed along one of the walls so as to be adjacent the magnetic stripe when a card is "swiped" through the slot. The output of the magnetic detector 828 is provided to controller/processor 822, which can process received data, generate outputs on a local output device 824 such as a visual display, and communicate with other devices if desired by means of an I/O port 826. In addition to these normal functions of a magnetic card reader, the reader 800 also includes the RF reading apparatus described above.

Figure 11:
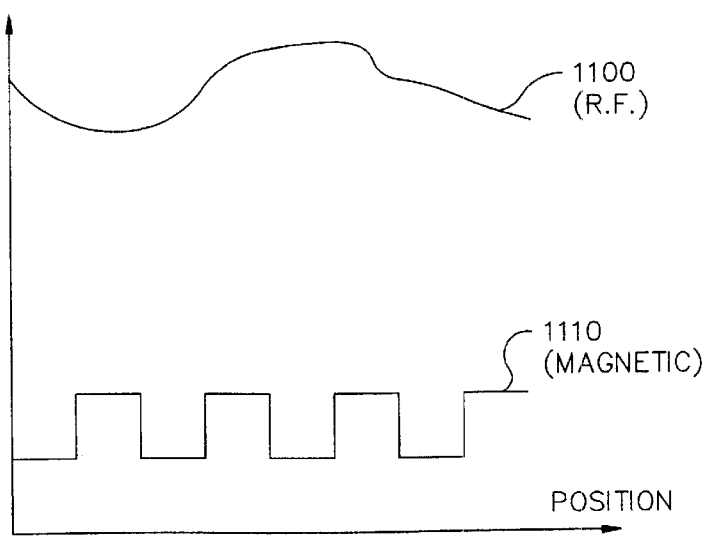
FIG. 11 is a diagram illustrating an RF signature which may be generated by illuminating a radio responsive target formed of randomly dispersed radio responsive resonators with an interrogating signal, in accordance with a preferred embodiment of the present invention.

Referring now to FIG. 11, there is shown a diagram illustrating an RF signature 1110 which may be received at detector 820 by illuminating a radio responsive target formed of randomly dispersed radio responsive resonators with an interrogating signal using the reader shown in FIGS. 8–10, in accordance with a preferred embodiment of the present invention. The horizontal axis of the graph in FIG. 11 corresponds to the position along a card being read, and the vertical axis is the received signal amplitude. Waveform 1110 illustrates a clocking signal which may be stored in the magnetic stripe for correlating the position of the card with the received RF signal as described above. When dipoles are randomly distributed in the target being read as shown in FIGS. 5 and 7, then the multiple reflections created by plural, randomly oriented dipoles in the swiping slot, result in an RF amplitude versus position waveform as illustrated by waveform 1110 of FIG. 11. The amplitude versus position characteristics of this waveform may be used to uniquely identify the card using the methods described above.

Figure 12A:
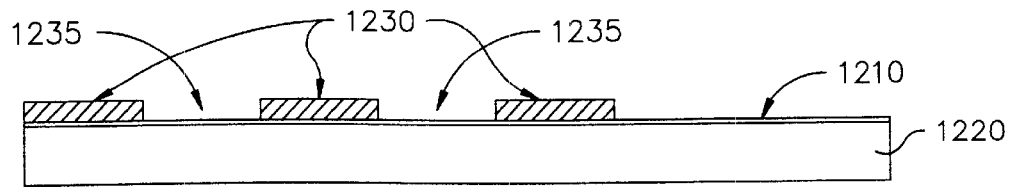
FIGS. 12A–12D illustrate a process for forming a radio frequency responsive target having of a pattern of thin dipoles which produce a composite analog radio frequency signal in response to an interrogating signal, in accordance with a preferred embodiment of the present invention.
Figure 12B:
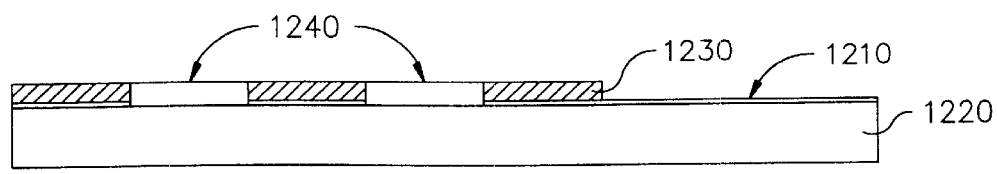
Figure 12C:
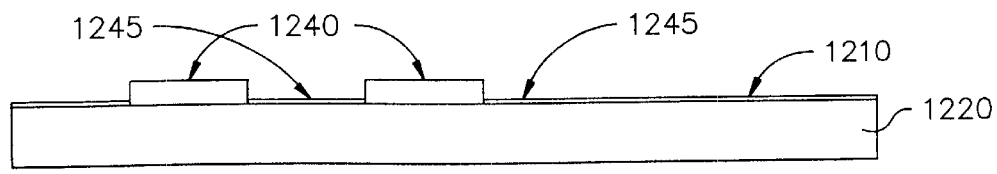
Figure 12D:
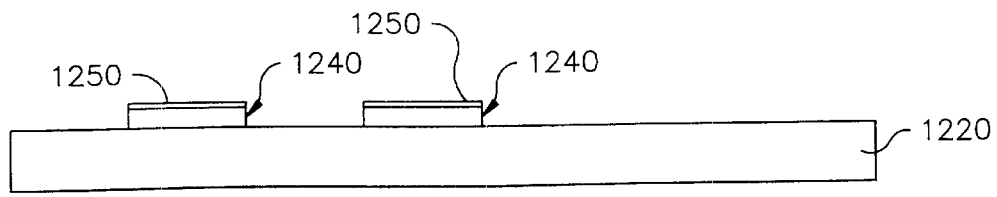

Referring now to FIGS. 12A–12D, there is shown a process for forming a radio frequency responsive target having a pattern of thin dipoles which produce a composite analog radio frequency signal in response to an interrogating signal, in accordance with a preferred embodiment of the present invention. As shown in FIG. 12A, a first metallic film layer 1210 is initially deposited on top of a non-conductive substrate 1220. The first metallic film layer 1210 preferably has a thickness of from 10 to 1000 angstroms. A pattern of thin dipoles is generated (for example by a computer) such that each of the thin dipoles has a position and an angular orientation within the pattern of thin dipoles. An etchant resistant pattern 1230 is then deposited on top of the first metallic film layer 1210, the etchant resistant pattern preferably corresponds to a photographic negative image of the pattern of thin dipoles. As shown in FIG. 12B, a second metallic layer 1240 is then applied on top of the first metallic film layer 1210 by, for example, passing the substrate 1220 through an electroplating bath, vapor deposition or sputtering. The second metallic 1240 layer occupies areas 1235 on the first metallic film layer where the etchant resistant pattern 1230 is absent, and the second metallic layer 1240 has a thickness equal to the thickness of the etchant resistant pattern 1230. As shown in FIG. 12C, the etchant resistant pattern 1230 is next removed in order to expose portions 1245 of the first metallic film layer 1210. The second metallic layer 1240 and the portions 1245 of the first metallic film layer 1210 are then etched simultaneously until (as shown in FIG. 12D) the portions 1245 of the first metallic film layer 1210 have been removed from the non-conductive substrate 1220. During this final etching step, a thickness 1250 equal to the thickness of the first metallic film layer 1210 is removed from the top of the second metallic layer 1240.

In a preferred embodiment of the method shown in FIGS. 12A–12D, the non-conductive substrate 1210 is formed of a plastic material. Non-conductive substrate 1210 may alternatively be formed of paper, a cloth material, a rubber material, or a leather material. The pattern of thin dipoles which corresponds to etchant resistant pattern 1230 is preferably randomly generated by a computer so as to form dipole patterns similar to those shown in FIGS. 5 and 7. In an alternative embodiment, the pattern of thin dipoles can be generated using an ordered (as opposed to random) algorithm. The thickness of the etchant resistant pattern 1230 preferably corresponds to the desired thickness of the thin dipoles to be disposed on the non-conductive substrate 1220 which, as described above, is from 100 angstroms to 2 millimeters.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method for forming a radio frequency responsive target, comprising the steps of:
    (A) depositing a first metallic film layer on a non-conductive substrate;
    (B) generating a pattern of thin dipoles, each of said thin dipoles having a position and m angular orientation within said pattern of thin dipoles;
    (C) depositing an etchant resistant pattern on top of said first metallic film layer, said etchant resistant pattern corresponding to a photographic image of said pattern of thin dipoles, said etchant resistant pattern having a thickness;
    (D) after step (C), applying a second metallic layer on top of said first metallic film layer, said second metallic layer occupying areas on said first metallic film layer where said etchant resistant pattern is absent, said second metallic layer having a thickness equal to said thickness of said etchant resistant pattern;
    (E) after step (D), removing said etchant resistant pattern in order to expose portions of said first metallic film layer, and
    (F) after step (E), simultaneously etching said second metallic layer and said portions of said first metallic film layer until said portions of said first metallic film layer have been removed from said non-conductive substrate;

wherein said target is formed of said pat of thin dipoles, and wherein said thin dipoles produce a composite analog radio frequency signal in response to an interrogating signal.

2. The method of claim 1, wherein said photographic image is a photographic negative image of said pattern of thin dipoles.

3. The method of claim 1, wherein said non-conductive substrate is formed of a plastic material.

4. The method of claim 1, wherein said non-conductive substrate is formed of paper.

5. The method of claim 1, wherein said non-conductive substrate is formed of a cloth material.

6. The method of claim 1, wherein said non-conductive substrate is formed of a rubber material.

7. The method of claim 1, wherein said non-conductive substrate is formed of a leather material.

8. The method of claim 1, wherein said pattern of thin dipoles is randomly generated in step (B).

9. The method of claim 1, wherein said second metallic layer is applied on top of said first metallic film layer in step (D) by passing said substrate through an electroplating bath.

10. The method of claim 1, wherein said second metallic layer is vapor deposited on top of said first metallic film layer in step (D).

11. The method of claim 1, wherein said second metallic layer is applied on top of said first metallic film layer in step (D) by sputtering.

12. The method of claim 1, wherein said thickness of said etchant resistant pattern corresponds to a desired thickness of said thin dipoles on said non-conductive substrate.

13. The method of claim 2, wherein said first metallic film layer has a thickness of from 10 to 1000 angstroms.

14. The method of claim 3, wherein said desired thickness of said thin dipoles is from 100 angstroms to 2 millimeters.

15. The method of claim 4, wherein each of said thin, dipoles has a length of about 0.5 millimeters, and said thin dipoles have a density on said non-conductive substrate of from 2 to 5 dipoles per square cm of surface area on said non-conductive substrate.

* * * * *

UNITED STATES PATENT AND TRADEMARK OFFICE
CERTIFICATE OF CORRECTION

PATENT NO.   : 6,471,878 B1
DATED        : October 29, 2002
INVENTOR(S)  : Greene et al.

It is certified that error appears in the above-identified patent and that said Letters Patent is hereby corrected as shown below:

Column 4,
Line 38, delete "12$c$," and insert therefor -- 12$n$ --.
Lines 41, 44, 47, 50 and 53, delete "12$c$" second occurrence and insert therefor -- 12$n$ --.

Column 9,
Line 56, delete "srp" and insert therefor -- stripe --.

Column 12,
Line 35, delete "2" and insert therefor -- 12 --.
Line 37, delete "3" and insert therefor -- 13 --.
Line 37, delete "4" and insert therefor -- 14 --.

Signed and Sealed this

Eighth Day of April, 2003

JAMES E. ROGAN
*Director of the United States Patent and Trademark Office*